US012672602B2

(12) United States Patent　　　　(10) Patent No.: US 12,672,602 B2

McEnaney et al.　　　　　　　　　　 (45) Date of Patent:　　　 Jul. 7, 2026

(54) DEVICE AND METHOD FOR COMBINED GENERATION AND FERTIGATION OF NITROGEN FERTILIZER

(71) Applicant: Nitricity Inc., Fremont, CA (US)

(72) Inventors: Joshua Michael McEnaney, East Palo Alto, CA (US); John Anthony Schwalbe, Palo Alto, CA (US); Nicolas Hunter Pinkowski, Stanford, CA (US); Brian Andrew Rohr, Palo Alto, CA (US)

(73) Assignee: Nitricity Inc., Fremont, CA (US)

( * ) Notice: Subject to any disclaimer, the term of this patent is extended or adjusted under 35 U.S.C. 154(b) by 1317 days.

(21) Appl. No.: 17/336,029

(22) Filed: Jun. 1, 2021

(65) Prior Publication Data

US 2021/0360847 A1　　 Nov. 25, 2021

Related U.S. Application Data

(63) Continuation-in-part of application No. 17/240,768, filed on Apr. 26, 2021, now Pat. No. 12,186,728.

(Continued)

(51) Int. Cl.
A01C 23/04　　　　(2006.01)
A01C 23/00　　　　(2006.01)
C05C 5/00　　　　 (2006.01)
(52) U.S. Cl.
CPC .......... A01C 23/042 (2013.01); A01C 23/007 (2013.01); C05C 5/00 (2013.01)
(58) Field of Classification Search
CPC ....... A01C 23/042; A01C 23/007; C05C 5/00; C05C 11/00; B01J 12/002; B01J 4/001;
(Continued)

(56) References Cited

U.S. PATENT DOCUMENTS 4,141,715 A　　 2/1979　 Wyse et al.
4,297,123 A　　 10/1981　Wyse et al.
(Continued)

FOREIGN PATENT DOCUMENTS

CA　　　　3036980　　　　 3/2018
CN　　 104291282　　　　 1/2015
(Continued)

OTHER PUBLICATIONS

Anastasopoulou, A. Conceptual Process Design of Plasma-Assisted Nitrogen Fixation through Energy, Environmental and Economic Assessment, Environmental and Economic Assessment, Technische Universiteit Eindhoven, Sep. 19, 2018 (189 pages).
(Continued)

*Primary Examiner* — Xiuyu Tai

(74) *Attorney, Agent, or Firm* — Polsinelli PC; Gregory P. Durbin

(57)　　　　　　 ABSTRACT

Systems for producing nitrogen compounds that are configured for integration with an irrigation device. The systems generally include an absorber receiving a reactor-outlet stream comprising one or more oxidized nitrogen species, the absorber containing water to produce a nitrogen-compound stream comprising nitrates, nitrites, nitric acid, salts thereof, or a mixture thereof; and a system-outlet port configured to be fluidically coupled to an irrigation line, the system-outlet port in fluid communication with the absorber to receive at least a portion of the nitrogen-compound stream and provide the nitrogen-compound stream to the irrigation line.

5 Claims, 6 Drawing Sheets

Related U.S. Application Data

(60) Provisional application No. 63/032,701, filed on May 31, 2020, provisional application No. 63/015,651, filed on Apr. 26, 2020.

(58) Field of Classification Search
CPC .............. B01J 19/088; B01J 2219/0807; B01J 2219/0894; B01J 19/0053; B01J 19/122; B01J 2219/0805; B01J 2219/00162; B01J 4/008; B01J 2219/0875; H01J 37/32082; H01J 37/32743; H01J 37/32844; H01J 37/32192; H01J 37/3244; B01D 53/8621; B01D 53/14; B01D 53/56; B01D 53/78; B01D 2255/1021; B01D 2255/2092; B01D 2251/604; B01D 2251/506; B01D 2255/1025; B01D 2257/404; B01D 2251/606; B01D 2255/1023; B01D 2251/104; B01D 2251/11; B01D 2255/20769; B01D 2251/304; B01D 2251/504; B01D 2251/404; B01D 2255/102; B01D 2259/80; B01D 2251/102; B01D 2251/512; C01C 1/185; C01B 21/26; Y02C 20/30
See application file for complete search history.

(56) References Cited

U.S. PATENT DOCUMENTS

| | | | |
|---|---|---|---|
| 4,451,436 | A | 5/1984 | O'Hare |
| 4,877,589 | A | 10/1989 | O'Hare |
| 5,192,355 | A | 3/1993 | Eastin |
| 6,193,934 | B1 | 2/2001 | Yang |
| 7,934,544 | B2 | 5/2011 | Hitzman et al. |
| 8,628,598 | B1 | 1/2014 | Miller et al. |
| 2007/0272543 | A1 | 11/2007 | Burlica et al. |
| 2009/0236215 | A1 | 9/2009 | Burlica et al. |
| 2010/0048850 | A1 | 2/2010 | Dubois |
| 2012/0297673 | A1 | 11/2012 | Keller |
| 2013/0028820 | A1 | 1/2013 | Lee et al. |
| 2015/0021277 | A1* | 1/2015 | Rothschild .............. C05C 11/00 210/85 |
| 2016/0102025 | A1 | 4/2016 | Nunnally et al. |
| 2018/0071707 | A1* | 3/2018 | Salerno ............... B01F 23/2341 |

FOREIGN PATENT DOCUMENTS

| | | |
|---|---|---|
| CN | 105294175 | 2/2016 |
| CN | 107075384 | 8/2017 |
| CN | 107875988 | 4/2018 |
| CN | 108990248 | 12/2018 |
| CN | 208667524 | 3/2019 |
| CN | 109627054 | 4/2019 |
| FR | 2709748 | 10/1995 |
| JP | 2019501007 | 1/2019 |
| TW | 201914969 | 4/2019 |
| WO | 2009/091978 | 7/2009 |
| WO | 2010/142004 | 12/2010 |
| WO | 2016/063302 | 4/2016 |
| WO | 2018/226313 | 12/2018 |

OTHER PUBLICATIONS

Hawtof et al., Catalyst-Free Highly Selective Synthesis of Ammonia from Nitrogen and Water by a Plasma Electrolytic System, Science Advances, 5:eaat5778, Jan. 11, 2019 (10 pages).

Hollevort et al., Towards Green Ammonia Synthesis Through Plasma-Driven Nitrogen Oxidation and Catalytic Reduction, Angewandte Chemie, 132(52):p. 24033-24037, Sep. 20, 2020 (14 pages).

International Searching Authority, International Search Report and Written Opinion, mailed in relationship to International Application No. PCT/US2021/035265, mailed Sep. 3, 2021 (11 pages).

* cited by examiner

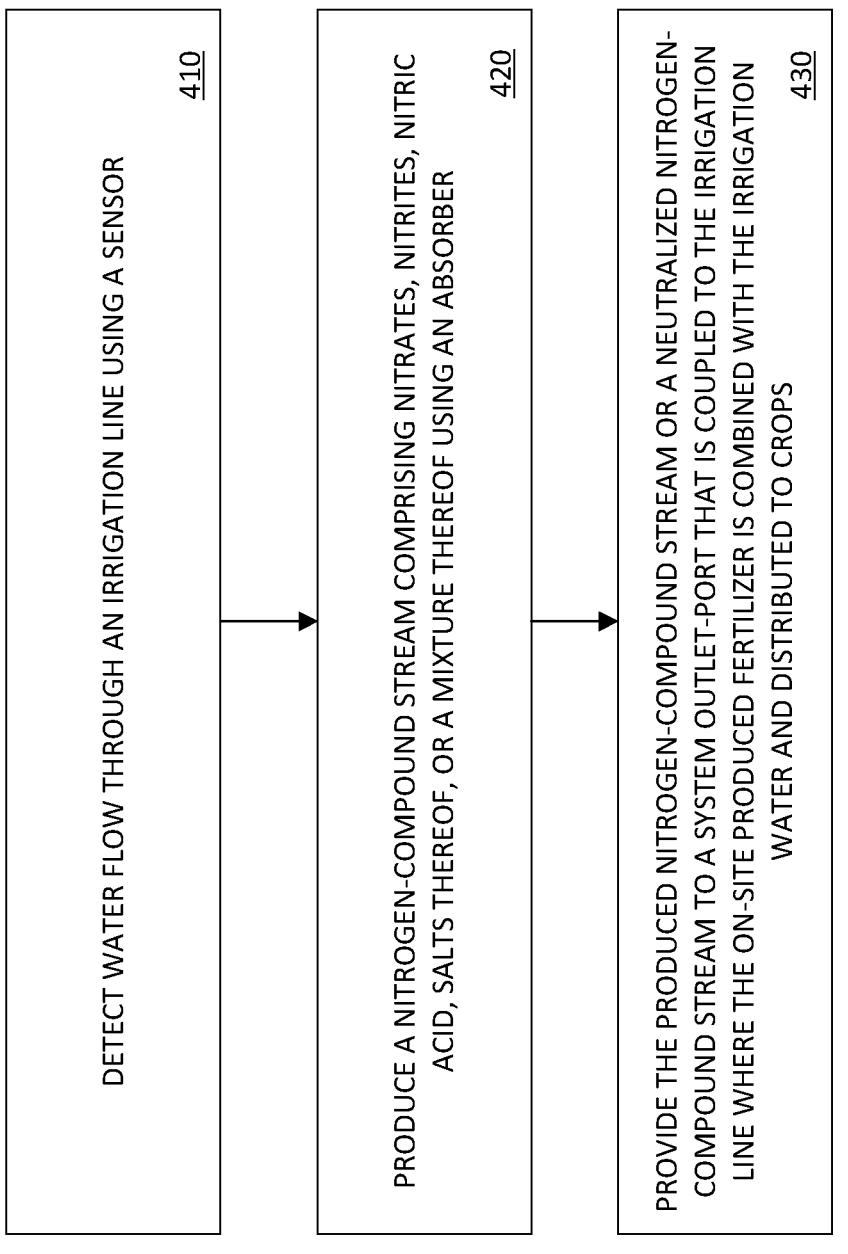

DETECT WATER FLOW THROUGH AN IRRIGATION LINE USING A SENSOR

410

PRODUCE A NITROGEN-COMPOUND STREAM COMPRISING NITRATES, NITRITES, NITRIC ACID, SALTS THEREOF, OR A MIXTURE THEREOF USING AN ABSORBER

420

PROVIDE THE PRODUCED NITROGEN-COMPOUND STREAM OR A NEUTRALIZED NITROGEN-COMPOUND STREAM TO A SYSTEM OUTLET-PORT THAT IS COUPLED TO THE IRRIGATION LINE WHERE THE ON-SITE PRODUCED FERTILIZER IS COMBINED WITH THE IRRIGATION WATER AND DISTRIBUTED TO CROPS

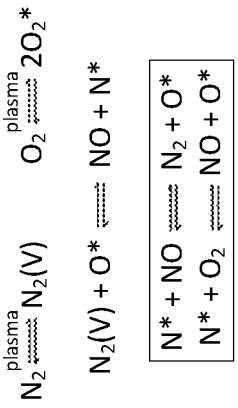
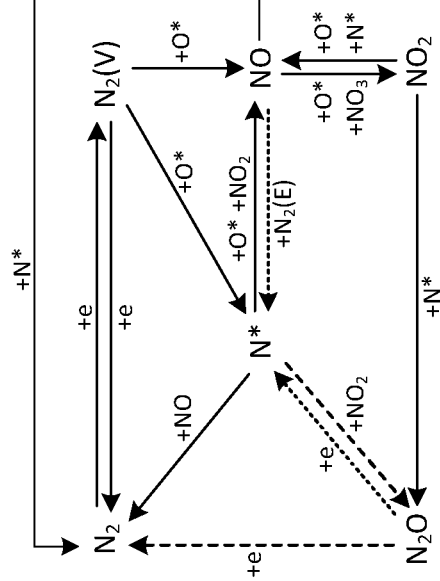
FIG. 6

DEVICE AND METHOD FOR COMBINED GENERATION AND FERTIGATION OF NITROGEN FERTILIZER

CROSS-REFERENCE TO RELATED APPLICATIONS

This application is related to and claims priority under 35 U.S.C. § 119(e) from U.S. Patent Application No. 63/032,701 filed May 31, 2020 entitled "A Device and Method for Combined Generation and Fertigation of Nitrogen Fertilizer," which is hereby incorporated by reference herein, and is a continuation-in-part of U.S. patent application Ser. No. 17/240,768 filed Apr. 26, 2021 entitled "Systems and Processes for Producing Fixed-Nitrogen Compounds," which claims priority under 35 U.S.C. § 119 from U.S. Provisional Application No. 63/015,651 filed Apr. 26, 2020 entitled "A Process for Producing Fixed Nitrogen Compounds from Air, Water, and Electricity, Incorporating a Plasma Reactor and a Recirculating Loop," which are both also hereby incorporated by reference herein.

TECHNICAL FIELD

The present invention relates generally to on-site fertilizer production from its elements on a farm, and delivering the fertilizer to agricultural fields. Specifically, it provides for a complete system with an integrated connection between an on-site fertilizer production unit and irrigation to reduce storage and transport of fertilizers.

BACKGROUND

As human development continues, nitrogen fertilizers are exceedingly important for growing crops that feed the world population and for the high yields that characterize modern agriculture. However, conventional fertilizer production and distribution has enormous energy, environmental and societal impacts.

Conventionally, ammonia, a common nitrogen fertilizer, is produced via the Haber-Bosch process by reacting $N_2$ with $H_2$ over an iron-based catalyst at high-pressure and temperature—conditions near 400° to 500° C. and 200+ atm. This process consumes more energy and contributes more greenhouse gas emissions than many other chemical processes. One reason for the large amount of greenhouse gas production is that fossil fuels are often the source of $H_2$ for the Haber-Bosch process. Typically, coal or natural gas is catalytically converted to $H_2$ and $CO_2$ in multiple steps before ammonia synthesis takes place. Because of the low conversion efficiency, high temperatures, and high pressures, ammonia production traditionally occurs in centralized facilities to be economical.

Additionally, conventional systems for producing nitrogen fertilizer utilize large facilities to produce significant amounts of nitrogen fertilizer. The nitrogen fertilizer is subsequently shipped, often across large areas, to farmers located hundreds to thousands of miles away from the fertilizer factories. Thus, besides inherent costs associated with conventional methods for producing nitrogen fertilizer, the nitrogen fertilizer must be shipped to a site and stored until needed.

There is a need for systems and processes capable of producing nitrogen fertilizers and nitrogen compounds in a more efficient and environmentally friendly manner. There is also a need to transition from a centralized-production model, where the fertilizer composition is limited by the production capabilities of large factories and freight, to a distributed-production model, where the fertilizer composition can be modified for specific farms and fields.

SUMMARY

The present disclosure generally relates to systems and methods for providing nitrogen compounds as fertilizers to agricultural fields. The systems disclosed herein can advantageously be located on or nearby the agricultural fields. As used herein, the term "on-site" typically refers to on the property of the agricultural field. By locating the systems for producing nitrogen compounds on-site or near the agricultural fields, the systems can reduce or eliminate shipping of nitrogen compounds, which provides cost and environmental benefits. Furthermore, locating the production of nitrogen compounds on the community or farm also opens up the possibility of directly producing fertilizer on the farm, which would allow farmers to produce the fertilizer they need when they need it.

The systems disclosed herein may be configured to integrate with an irrigation system or a component thereof by being fluidically coupleable to an irrigation system or an irrigation line thereof. Suitable irrigation systems include, but are not limited to, drip irrigation, center pivot irrigation, sprinkler system, hose irrigation system, manual irrigation system, sub irrigation system, surface irrigation system, localized irrigation system, groundwater well system, irrigation reservoir system, fertigation system, subsurface drip irrigation, a hydroponics system, indoor farming irrigation, and algae farming irrigation. The systems disclosed herein may be mobile or easily moved to various locations on or near agricultural fields.

Additionally, the systems may provide nitrogen compounds in the form of nitric acid, nitrates, nitrites, which are typically more difficult and expensive to ship than certain conventional fertilizers, such as ammonia. Nitrogen compounds, such as nitric acid and nitrates, for example, can provide enhanced crop yields and less greenhouse gas emissions as compared to certain conventional ammonium-based fertilizers, in most aerobic soils. For example, the systems may produce fertilizers with substantially different qualities than those that are trucked, for example, those having a low or high pH, greater mineral/nutrient content, or a greater reactivity with soil compounds, such as a greater reactivity with rock phosphate. Accordingly, the systems disclosed herein may provide enhanced crop yields as compared to certain conventional fertilizers (e.g., ammonia), while simultaneously avoiding the environmentally deleterious effects and sometimes prohibitive costs of shipping.

In one aspect, the present disclosure relates to a system for producing nitrogen compounds that is configured for integration with an irrigation device. The system may include an absorber receiving a reactor-outlet stream comprising one or more oxidized nitrogen species, the absorber containing water to produce a nitrogen-compound stream comprising nitrates, nitrites, nitric acid, salts thereof, or a mixture thereof; and a system-outlet port configured to be fluidically coupled to an irrigation line, the system-outlet port in fluid communication with the absorber to receive at least a portion of the nitrogen-compound stream and provide the nitrogen-compound stream to the irrigation line.

According to some aspects, the system includes a plasma reactor producing the reactor-outlet stream comprising one or more oxidized nitrogen species, the plasma reactor in fluid communication with the absorber. Additionally or alternatively, the system may include a storage chamber in fluid communication with the absorber to receive the nitrogen-compound stream from the absorber. The storage chamber may be a neutralization chamber configured to produce a neutralized nitrogen-compound stream comprising at least one neutralized nitrogen compound. The neutralization chamber may contain at least one neutralization compound chosen from calcium carbonate, sodium carbonate, magnesium carbonate, calcium hydroxide, potassium carbonate, potassium hydroxide, potash, lime grit, limestone, rock phosphate, ammonium hydroxide, calcium nitrate, zinc oxide, potassium nitrate, sodium nitrate, nitrophosphates, ammonium nitrate, zinc nitrate, and a combination thereof. In at least one instance, the neutralization chamber includes a filter coupled to an outlet port of the neutralization chamber. The filter of the neutralization chamber may have a pore or particle-filtration size of about 10 to about 1000 microns and be configured to prohibit particles of the neutralization compound from passing therethrough.

In accordance with another aspect, the system includes a mixing chamber in fluid communication with the neutralization chamber and configured to receive and mix the neutralized nitrogen-compound stream. In certain embodiments, the system includes an injection pump in fluid communication with the neutralization chamber, the injection pump configured to pump the neutralized nitrogen-compound stream to the system-outlet port. Additionally or alternatively, the system may include a one-way valve in fluid communication with the system-outlet port and configured to permit fluid to flow therethrough in solely one direction. The one-way valve may be arranged to permit fluid to flow to the system-outlet port. A one-way valve may be disposed within a conduit downstream from the injection pump.

According to a further aspect, the system includes an outlet filter in fluid communication with the system-outlet port. The system-outlet filter may be downstream from the injection pump and upstream from the system-outlet port. The system-outlet filter may, additionally or alternatively, be downstream from the neutralization chamber and upstream from the injection pump.

In accordance with another aspect, the system includes a water-inlet conduit fluidically coupleable to the irrigation line and configured to receive water from the irrigation line. The water-inlet conduit may be in fluid communication with the absorber and may be configured to provide water to the absorber.

According to a further aspect, the system includes one or more of: a housing, the housing contains the plasma reactor and the absorber; and a chassis, wherein the plasma reactor and the absorber are coupled to and support by the chassis.

In accordance with another aspect, the system includes a sensor for detecting liquid flow through the irrigation line; and a controller coupled to the sensor, the controller configured to activate the release the nitrogen-compound stream, the neutralized nitrogen-compound stream, or a combination thereof through the system output port and into the irrigation line in response to liquid flowing through the irrigation line. Additionally or alternatively, the system may include a sensor for detecting a composition of a liquid in the absorber; and a controller coupled to the sensor. The controller may be configured to activate the release of the nitrogen-compound stream from the absorber and deactivate the plasma reactor in response to the composition of the liquid in the absorber. The sensor may be chosen from a flow meter, a pH detector, an ionicity detector, liquid level sensor, or a combination thereof. In some instances, the sensor is chosen from a conductivity meter, a pH detector, an ionicity detector, a liquid level sensor, a thermal detector, a laser-based composition detector, or a combination thereof.

In another aspect, a system is provided for producing nitrogen compounds that is configured for integration with an irrigation device. The system may include a neutralization chamber configured to neutralize nitric acid and produce a neutralized nitrogen-compound stream comprising one or more neutralized nitrogen compounds; and a system-outlet port fluidically coupleable to an irrigation line. The system-outlet port may be in fluidic communication with the neutralization chamber and configured to receive at least a portion of the neutralized nitrogen-compound stream and provide the at least a portion of the neutralized nitrogen-compound stream to the irrigation line. The neutralization chamber may contain at least one neutralization compounds chosen from calcium carbonate, sodium carbonate, magnesium carbonate, calcium hydroxide, potassium carbonate, potassium hydroxide, potash, lime grit, limestone, rock phosphate, ammonium hydroxide, calcium nitrate, zinc oxide, potassium nitrate, sodium nitrate, nitrophosphates, ammonium nitrate, zinc nitrate, and a combination thereof.

According to another aspect, the system includes a mixing chamber in fluidic communication with the neutralization chamber and configured to receive and mix the nitrogen-compound stream. The system may have an injection pump in fluidic communication with the neutralization chamber and may be configured to pump the one or more neutralized nitrogen-compounds to the system-outlet port. In at least one embodiment, the system includes a one-way valve in fluid communication with the system-outlet port, the one-way valve located downstream from the mixing chamber and configured to prohibit fluid from flowing from the system-outlet port to the mixing chamber. Additionally or alternatively, the system includes a water-inlet conduit fluidically coupleable to the irrigation line and configured to receive water from the irrigation line.

In a further aspect, provided is a system for producing nitrogen compounds. The system may include a plasma reactor configured to receive an inlet stream and to produce a reactor-outlet stream comprising one or more oxidized nitrogen species; an absorber in fluid communication with the plasma reactor, the absorber containing water and configured to receive the reactor-outlet stream and to produce a nitrogen-compound stream comprising nitrates, nitrites, nitric acid, salts thereof, or a mixture thereof; a storage chamber in fluid communication with the absorber, the storage chamber configured to receive the nitrogen-compound stream; and a system-outlet port fluidically coupleable to an irrigation line, the system-outlet port in fluidic communication with the storage chamber to receive at least a portion of the nitrogen-compound stream and provide the at least portion of the nitrogen-compound stream to the irrigation line.

In accordance with a further aspect, the storage chamber is a neutralization chamber, the neutralization chamber configured to neutralize nitric acid and produce a neutralized nitrogen-compound stream. The system may further have a mixing chamber in fluidic communication with the neutralization chamber or the absorber and configured to receive and mix the neutralized nitrogen-compound stream or the nitrogen-compound stream. In at least one embodiment, the system does not include a pump or compressor located downstream of the absorber and upstream of the mixing chamber.

According to another aspect, the system includes one or more of: a housing, the housing containing the plasma reactor, the absorber, and the mixing chamber; and a chassis, wherein the plasma reactor, the absorber, and the mixing chamber are coupled to and support by the chassis. Additionally or alternatively, the system may include a water-inlet conduit fluidically coupleable to the irrigation line and configured to receive a liquid comprising water from the irrigation line. The water-inlet conduit may be in fluidic communication with the absorber to provide the liquid from the irrigation line to the absorber. In at least one embodiment, the water-inlet conduit provides liquid from the irrigation line to cool the plasma reactor. The irrigation line may be part of a drip irrigation system, a center pivot irrigation system, a sprinkler system, a hose irrigation system, manual irrigation system, a sub irrigation system, a surface irrigation system, a localized irrigation system, a groundwater well, irrigation reservoir system, a fertigation system, a subsurface drip irrigation system, a hydroponics system, an indoor farming irrigation system, or an algae farming irrigation system.

In accordance with a further aspect, the system further includes a sensor for detecting liquid flow through the irrigation line; and a controller coupled to the sensor, the controller configured to activate the flow of the nitrogen-compound stream and/or neutralized nitrogen-compound stream through the system output port and into the irrigation line in response to liquid flowing through the irrigation line. The sensor for detecting liquid flow may be a flowmeter or a pressure sensor.

According to another aspect, provided is a method for providing nitrogen compounds to an irrigation system. The method may include detecting water flow through an irrigation line using a sensor; producing a nitrogen-compound stream comprising nitrates, nitrites, nitric acid, salts thereof, or a mixture thereof using an absorber; and providing the nitrogen-compound stream to a system-outlet port that is coupled to the irrigation line.

In accordance with further aspects, the method may include determining the amount of liquid in the absorber using a sensor or a timer; and activating at least one of a valve and a pump to provide water to the absorber. The method may include neutralizing the nitrogen-compound stream to produce a neutralized nitrogen-compound stream using a neutralization chamber. In at least one embodiment, the method includes determining a pH of nitrogen-compound stream using a pH meter; and activating a valve, using a controller, to permit flow of the nitrogen-compound stream to the neutralization chamber and/or the system-outlet port that is coupled to the irrigation line. Additionally or alternatively, the method may include determining a concentration of nitrogen-compound stream using a conductivity meter; and activating a valve, using a controller, to permit flow of the nitrogen-compound stream to the neutralization chamber and/or the system-outlet port that is coupled to the irrigation line. In at least one embodiment, the method includes providing water to a cooling jacket or radiator coupled to the plasma reactor.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. It should be noted that the drawings are not necessarily to scale; however the emphasis instead is being placed on illustrating the principles of the inventive concepts. Also, in the drawings the like reference characters may refer to the same parts or similar throughout the different views. It is intended that the embodiments and figures disclosed herein are to be considered illustrative rather than limiting.

FIG. 5 illustrates an exemplary, non-limiting method for providing nitrogen compounds to an irrigation line in accordance with aspects of the disclosure.

FIG. 6 is a diagram illustrating a reaction scheme including between molecular nitrogen (N2) and molecular oxygen (O2) as a plasma during use of the systems described herein.

DETAILED DESCRIPTION

Figure 1:
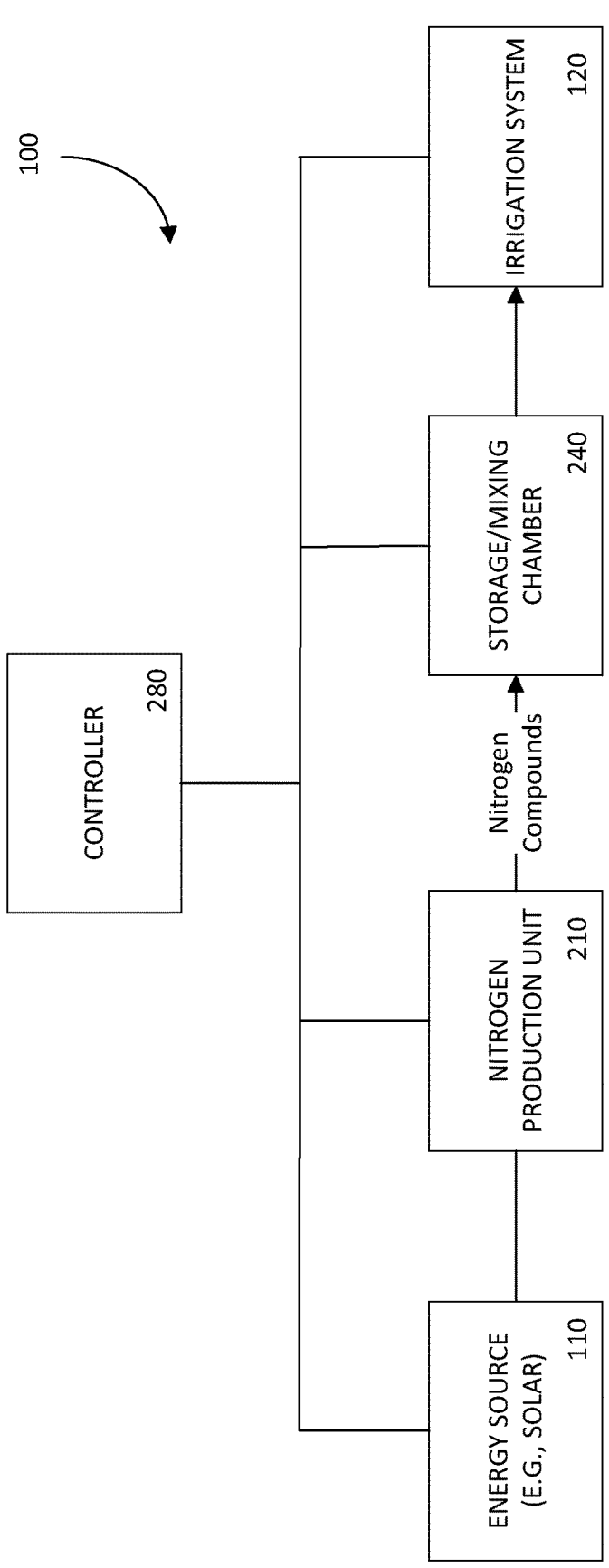
FIG. 1 illustrates a non-limiting, exemplary system for producing nitrogen compounds that is configured for integration with an irrigation system in accordance with aspects of the disclosure.

With reference to FIG. 1, provided is a diagram of an on-site nitrogen producing system 100 coupled to a solar panel 110 or other energy source and an irrigation system 120. In some cases, a source of intermittent, renewable energy or grid electricity provides electricity to the nitrogen production unit 210. System 100 may be designed to avoid or be free of batteries.

In certain embodiments, the nitrogen production unit 210 includes a non-thermal plasma reactor 212 and an absorber 220 to convert air and electricity into nitric acid and nitrate fertilizers. The rapid start-up time of such reactors may be especially advantageous in certain implementations.

The nitrogen production unit 220 may have certain process parameters such as flow rates in the system, power applied to the reactor, pressure in the reactor, and others not mentioned here that are controlled by a controller 280. Controller 280 may have electronic and mechanical devices designed to provide feedback to controller 280, such as availability of renewable electricity, forecasted electricity, fertilizer demand, soil acidity, etc. Additionally or alternatively, controller 280 may be configured to receive information and/or data regarding the streams produced by system 100, operating parameters of one or more component (s) of system 100, the properties of the contents in the one or more components (e.g., plasma reactor 212, absorber 220, neutralization chamber 230, mixing chamber 240, etc.) of system 100, water flow through an irrigation system or a component thereof, etc. Controller 280 may be a computational device, such as a programmable logic controller, microcontroller, distributed control system, supervisory control and data acquisition (SCADA), or computer that receives information obtained by detectors and/or sensors. Controller 280 may be configured to coordinate the production of nitrogen compounds, the flow/reaction/storage of nitrogen compounds, and the application of the nitrogen compounds.

The nitrogen production unit 210 dispenses the nitrogen compounds, e.g., in a nitrogen-compound stream and/or a neutralized nitrogen-compound stream, into a mixing chamber 240, which may also be used for storage. The sizing of this container is determined by the fertilizer needs of the farm and the expected amount of intermittent electricity. Additional compounds may be added into mixing chamber 240 to meet the nutrient needs of the farm. This may include calcium, potassium, sulfur, potassium, phosphorus, etc.

Figure 2:
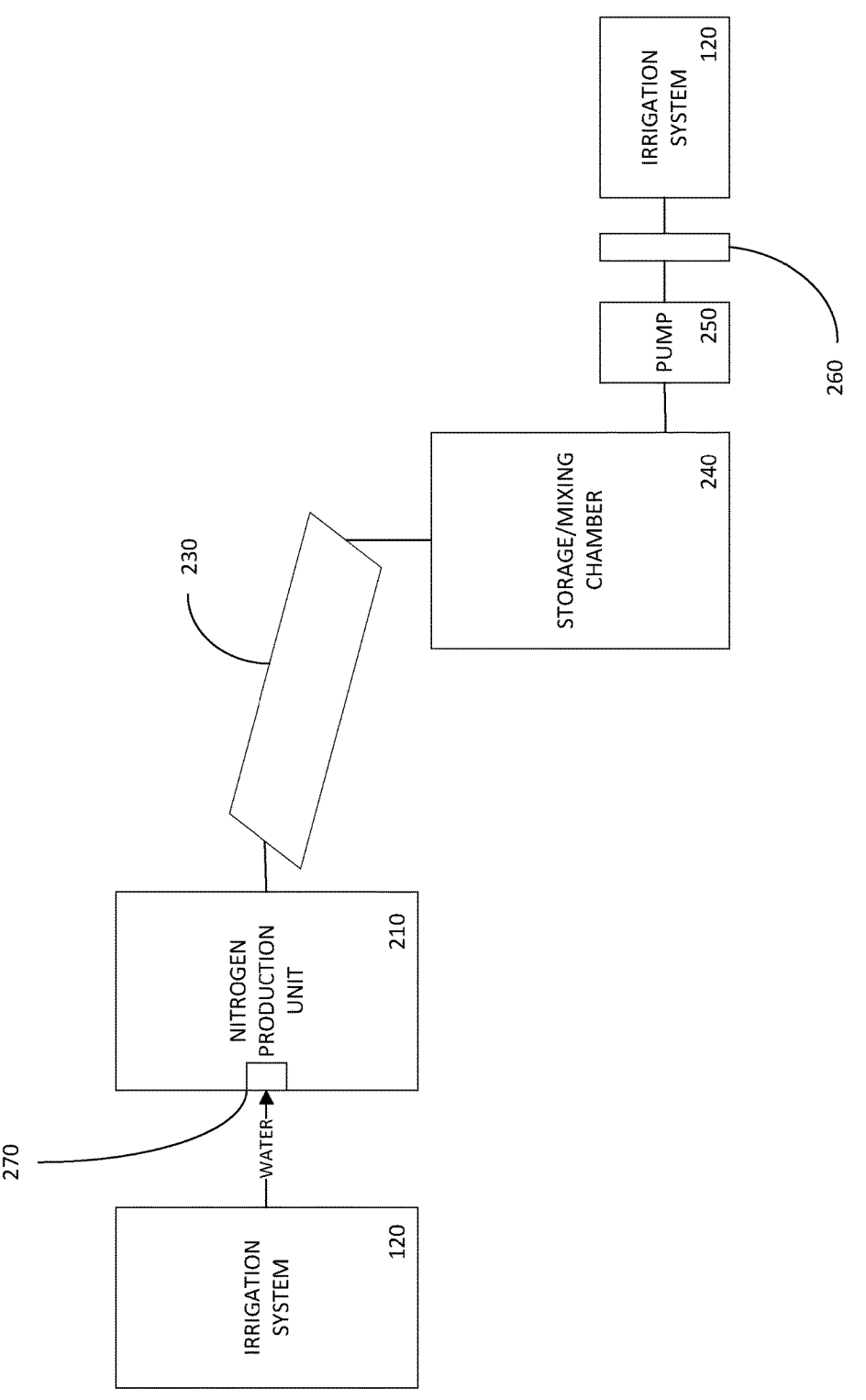
FIG. 2 illustrates another non-limiting, exemplary system for producing nitrogen compounds that is configured for integration with an irrigation system according to aspects of the disclosure.

With reference to FIG. 2, in one embodiment, provided is a system 200 for producing nitrogen compounds that is integratable by way of fluid communication to an irrigation system or a section thereof. As a brief overview, system 200 may comprise a nitrogen producing unit 210, a neutralization chamber 230, a mixing chamber 240, an injection pump 250, and a system-outlet port 260 configured to be fluidically coupled to an irrigation system or a section thereof, such as an irrigation line.

Nitrogen producing unit 210 may comprise a plasma reactor 212 and an absorber 220. Suitable systems for use as nitrogen producing unit 210 may be found in U.S. patent application Ser. No. 17/240,768, which is incorporated herein in its entirety for all purposes. Plasma reactor 212 of system 200 is configured to produce a plasma of nitrogen, oxygen, or a combination thereof. In one specific example, plasma reactor 212 is configured to produce a non-thermal plasma of nitrogen, oxygen, or a mixture thereof. Non-thermal plasma refers to any plasma that is not in thermodynamic equilibrium, e.g., because the ion temperature is different from the electron temperature or because the velocity distribution of one of the species does not follow a Maxwell-Boltzmann distribution. Because the electrons of non-thermal plasma may have a temperature that is significantly greater (e.g., orders of magnitude greater) than the other species in the reactor, it is believed that the electrons may be used for activating and/or reacting molecular nitrogen and oxygen. Without being limited to any specific theory, the following reactions illustrated in the reaction scheme of FIG. 6 may occur between molecular nitrogen ($N_2$) and molecular oxygen ($O_2$) as a plasma during use.

Plasma reactor 212 may include electrodes for producing the plasma of nitrogen and/or oxygen. For example, the plasma may be generated by maintaining an adequately high voltage between two electrodes, e.g., in a gliding-arc configuration. Alternatively, plasma reactor 212 may include, e.g., propeller-style electrodes, helical electrodes, and/or 2D electrodes. In some embodiments, the electrodes may be chosen from glow-discharge electrodes, dielectric-barrier discharge electrodes, gliding-arc discharge electrodes, and a combination thereof. The electrodes may also be hollow to allow for cooling liquids or gasses to be passed through them. The electrodes may be connected via reversible mechanical means to electrical contacts for ease of maintenance. In at least one embodiment, plasma reactor 212 may not include of electrodes (i.e., may be free of electrodes). Non-limiting examples of plasma reactors that do not require electrodes include microwave plasma reactors and RF plasma reactors.

Plasma reactor 212 may be configured for directing and shaping the plasma produced therein. For instance, the plasma reactor 212 may produce a magnetic field for shaping and/or directing the plasma. The magnetic field generally causes ions and electrons in plasma to travel along magnetic field lines.

Additional or alternatively, plasma reactor 212 may include a nozzle to direct gas flow, maintain heat transfer, and encourage desirable thermal or non-thermal operation of the plasma reactor 212. The nozzle can change the gas flow in the reactor to move the plasma, cause the plasma to break and reform, and can change the temperature or pressure of the reactor chamber due to its shape and positioning. For example, a narrow nozzle aimed at diverging electrodes will cause the plasma to glide and expand across the electrodes more rapidly than with a wide gas inlet.

Plasma reactor 212 may produce the plasma at pressures of about 0 to about 20 bar, preferably about 0.1 to about 5. The body of the plasma reactor may reach a temperature of about 0 to about 3000° C. In at least one embodiment, the temperature of the body of the plasma reactor is about 20 to about 500° C. The temperature of the plasma can reach much higher temperatures, such as from about 2000 to about 5000° C. Generally speaking, the plasma reactor 1 is configured to receive an inlet stream and to produce a reactor-outlet stream comprising one or more oxidized nitrogen species, such as NO, $NO_2$, $N_2O_4$, $N_2O$, $HNO_2$, $HNO_3$, $N_2O_5$, or a mixture thereof.

System 200 may provide the reactor-outlet stream to the absorber 7. More particularly, system 200 may include a reactor-outlet conduit coupled to plasma reactor 212 and configured for receiving the reactor-outlet stream from plasma reactor 212. The reactor-outlet conduit is also fluidically coupled to absorber 220, such that the reactor-outlet stream flows from plasma reactor 212 through the reactor-outlet conduit to absorber 220. In one implementation, the reactor-outlet stream flows by way of gravity from plasma reactor 212 to absorber 220. The reactor-outlet stream may comprise one or more oxidized nitrogen species and/or ammonia. Oxidized nitrogen species may refer to compounds formed from nitrogen molecules and/or compounds (e.g., molecular nitrogen) that has been oxidized. For example, oxidized nitrogen species may refer to NO, $NO_2$, $N_2O_4$, $N_2O$, HNO, $HNO_2$, $HNO_3$, $N_2O_5$, etc. In some embodiments, the systems and methods disclosed herein may produce one or more of oxidized nitrogen species, such as those chosen from NO, $NO_2$, $N_2O_4$, $N_2O$, HNO, $HNO_2$, $HNO_3$, $N_2O_5$, and a mixture thereof.

The reactor-outlet conduit is configured for receiving reactor-outlet stream. The reactor-outlet conduit may have a structure and be formed of a material, such as a metal, metal alloy, plastic, ceramic, or the like, that is suitable for receiving and containing corrosive contents. For example, the reactor-outlet conduit may be a pipe, tube, or the like having a thickness and/or structure based on the contents flowing therethrough, the pressure exerted on the reactor-outlet conduit, and other design parameters. Preferably, the reactor-outlet conduit has structure and is formed of a material that is suitable for high temperature, high pressure, and is resistant to corrosion. In at least one embodiment, the reactor conduit may have a liner with a high corrosion resistance coupled or attached to the inner surface of the reactor conduit.

Absorber 220 is coupled to the reactor-outlet conduit and is configured to receive the reactor-outlet stream. Absorber 220 may be a packed column, a bubble absorption unit, a spray tower, a plate column, tray column, film column, or a turbulent pool for gas absorption. Absorber 220 may include a diffuser for diffusing the reactor outlet stream into the absorber 220. For example, absorber 220 may be a bubble absorption unit and may contain a diffuser for diffusing the reactor-outlet stream, e.g., via bubble, into a liquid contained in absorber 220. In at least one embodiment, diffuser is submerged in the liquid contained in absorber 220. The diffuser may be a porous media constructed of ceramic, metal, or glass material.

Absorber 220 may be configured to produce nitrogen-compound stream comprising water, nitrates, nitrites, nitric acid, salts thereof, or a mixture thereof from the reactor-outlet stream. Generally, absorber 220 is configured to produce a gas phase and a liquid phase. For example, absorber 220 may be configured to produce nitrogen compounds (such as, nitrates, nitrites, nitric acid, and/or salts thereof) by dispersing the reactor-outlet stream through a liquid phase contained in absorber 220. The liquid phase may be water or an aqueous solution. By dispersing the reactor-outlet stream throughout the liquid phase (e.g., a liquid phase comprising or consisting of water), certain compounds of the reactor-outlet stream are absorbed into the liquid phase and further oxidized to the desired nitrogen compounds. Preferably, about 50 wt. % or more of the oxidized nitrogen species in the reactor-outlet stream are converted in the absorber 220, based on the total volume oxidized nitrogen species in the reactor-outlet stream. For example, the conversion of oxidized nitrogen species in the absorber(s) 220 may be about 30 vol. % to about 90 vol. %; about 40 vol. % to about 90 vol. %, about 50 vol. % to about 90 vol. %, about 60 vol. % to about 90 vol. %, about 70 vol. % to about 90 vol. %, about 80 vol. % to about 90 vol. %; about 30 vol. % to about 80 vol. %; about 40 vol. % to about 80 vol. %, about 50 vol. % to about 80 vol. %, about 60 vol. % to about 80 vol. %, about 70 vol. % to about 80 vol. %; about 30 vol. % to about 70 vol. %; about 40 vol. % to about 70 vol. %, about 50 vol. % to about 70 vol. %, about 60 vol. % to about 70 vol. %; about 30 vol. % to about 60 vol. %; about 40 vol. % to about 60 vol. %, or about 50 vol. % to about 60 vol. %, including any ranges or subranges therebetween, as measured by difference in the total amount/volume of oxidized nitrogen species in the reactor-outlet stream and the amount/volume of total oxidized nitrogen species in the gas stream leaving the absorber (e.g., the first absorber). In some cases, any of the foregoing conversions of oxidized nitrogen species is obtained using a plurality of absorbers 220, as measured by the difference in the total volume/amount of oxidized nitrogen species in the reactor-outlet stream and the volume/amount of total oxidized nitrogen species in the gas stream leaving the last absorber (e.g., the most downstream absorber). The compounds traversing through the liquid phase form the gas phase produced by absorber 220. The gas phase produced by absorber 220 may be recycled to plasma reactor 212, via a recycle stream conduit, as disclosed in U.S. patent application Ser. No. 17/240,768, which is incorporated herein by reference in its entirety for all purposes. The liquid phase of absorber 220 forms the nitrogen-compound stream produced by absorber 220.

The liquid phase of absorber 220 absorbs at least a portion of the nitrates, nitrites, nitric acid, salts thereof, or a mixture thereof. A basic compound, such as those chosen from calcium carbonate, sodium hydroxide, potassium hydroxide, and a mixture thereof may be added to the liquid phase. In certain embodiments, absorber 220 produces a salt from the nitric compounds by containing a basic compound in the liquid phase. Additionally or alternatively, the liquid phase may comprise an acidic compound including, e.g., nitric acid, phosphoric acid, or sulfuric acid. The acidic compound may be added to the absorber. For example, the liquid phase may contain an acidic compound, such that the liquid phase has a pH of about 0 to about 7, about 2 to about 7, about 3 to about 7, about 4 to about 7, about 4 to about 6.5., about 5 to about 6.5, or any ranges or subranges thereof. In some cases, an oxidizing compounds, such as hydrogen peroxide and/or ozone, may be added to the liquid phase. For example, the liquid phase may include one or more oxidizing compounds to oxidize one or more nitrogen compounds in the liquid phase. Peroxide can promote the oxidization of nitrites to nitrates. Additionally or alternatively, hydrogen peroxide may promote react with nitrous acid to produce nitric acid and water in the liquid phase. Hydrogen peroxide in water may also increase the ability to capture NO and/or $NO_2$ by oxidation and accelerating the cascade toward nitrates. Ozone may increase the rate of conversion of NO to $NO_2$ in the gas phase ($NO_2$ is more rapidly absorbed by an aqueous liquid phase than NO). For example, ozone may react with NO to produce $NO_2$ and $O_2$. In some embodiments, the liquid phase may comprise a catalyst. The catalyst may comprise platinum, palladium, hafnium, molybdenum, tungsten, zirconium, or a mixture thereof. For example, the catalyst may include $WO_3$, $MoO_3$, $ZrO_2$, $HfO_2$, or combinations thereof.

The nitrogen producing unit 210 or a component thereof (e.g., plasma reactor 212 or absorber 220) may operate at a pressure of about 10 psi to about −10 psi. For example, nitrogen producing unit 210 or a component thereof may operate a pressure of about 10 psi to about −10 psi, about 9 psi to about −10 psi; about 8 psi to about −10 psi, about 7 psi to about −10 psi, about 6 psi to about −10 psi, about 5 psi to about −10 psi, about 4 psi to about −10 psi, about 3 psi to about −10 psi, about 2 psi to about −10 psi, about 1 psi to about −10 psi; about 10 psi to about −8 psi, about 9 psi to about −8 psi; about 8 psi to about −8 psi, about 7 psi to about −8 psi, about 6 psi to about −8 psi, about 5 psi to about −8 psi, about 4 psi to about −8 psi, about 3 psi to about −8 psi, about 2 psi to about −8 psi, about 1 psi to about −8 psi; about 10 psi to about −6 psi, about 9 psi to about −6 psi; about 8 psi to about −6 psi, about 7 psi to about −6 psi, about 6 psi to about −6 psi, about 5 psi to about −6 psi, about 4 psi to about −6 psi, about 3 psi to about −6 psi, about 2 psi to about −6 psi, about 1 psi to about −6 psi; about 10 psi to about −4 psi, about 9 psi to about −4 psi; about 8 psi to about −4 psi, about 7 psi to about −4 psi, about 6 psi to about −4 psi, about 5 psi to about −4 psi, about 4 psi to about −4 psi, about 3 psi to about −4 psi, about 2 psi to about −4 psi, about 1 psi to about −4 psi; about 10 psi to about −2 psi, about 9 psi to about −2 psi; about 8 psi to about −2 psi, about 7 psi to about −2 psi, about 6 psi to about −2 psi, about 5 psi to about −2 psi, about 4 psi to about −2 psi, about 3 psi to about −2 psi, about 2 psi to about −2 psi, about 1 psi to about −2 psi; about 10 psi to about −1 psi, about 9 psi to about −1 psi; about 8 psi to about −1 psi, about 7 psi to about −1 psi, about 6 psi to about −1 psi, about 5 psi to about −1 psi, about 4 psi to about −1 psi, about 3 psi to about −1 psi, about 2 psi to about −1 psi, about 1 psi to about −1 psi, including ranges and subranges therebetween.

System 200 may include a nitrogen-compound conduit in fluid communication with absorber 220 and configured for receiving the nitrogen-compound stream. The nitrogen-compound conduit may have a structure and be formed of a material that is suitable for receiving and containing the nitrogen-compound stream. For example, the nitrogen-compound conduit may be a pipe, tube, or the like formed of a material, such as a metal, metal alloy, plastic, ceramic, or the like. The thickness and structure of the nitrogen-compound conduit may vary depending on the contents flowing therethrough, the pressure exerted on the conduit, and other design parameters.

System 200 may include a neutralization chamber 230 configured to produce a neutralized nitrogen-compound stream comprising at least one neutralized nitrogen compound. Neutralization chamber 230 may be in fluid communication with absorber 220, e.g., by way of nitrogen-compound conduit, to receive the nitrogen-compound stream from the absorber. In one embodiment, neutralization unit 230 is configured to neutralize nitric acid. Neutralization chamber 230 may contain neutralization agent, such as sodium carbonate, magnesium carbonate, calcium hydroxide calcium nitrate, lime grit, potassium nitrate, sodium nitrate, other nitrate-based compounds, nitrophosphates, ammonium nitrate, and a combination thereof. Neutralizing chamber 230 may contain a neutralization agent, which may include a basic compound, such as $CaCO_3$, $Ca(OH)_2$, KOH, $K_2CO_3$, lime, potash, sodium salts, rock phosphate, and other salts or minerals which may be used to neutralize nitric acid. In one embodiment, neutralization chamber 230 contains one or more, either uniformly or uniquely, of calcium carbonate, potassium carbonate, calcium hydroxide, potassium hydroxide, rock phosphate, or other alkaline compounds to neutralize the acid from nitrogen producing unit 210. The neutralization agents, when in solid form, may, in various examples, have an average particle size of preferably greater than 2 mm in diameter to avoid clogging filters. The neutralization agents may have a porosity or particle size, such that the neutralization agents dissolve at a desirable rate. Additionally or alternatively, the neutralization chamber may be configured to increase the turbulence within the neutralization chamber to increase the rate that the neutralization agent dissolves.

Neutralizing chamber 230 may be coupled to a conduit for providing a neutralization agent to neutralizing unit 230. The conduit coupled to neutralizing unit 230 may be configured for receiving solid, liquid, or gaseous neutralization agents. By using an absorber 220 that is separate from neutralization chamber 230, the production of nitrogen compounds and/or fertilizers can be completed using batch-mode conversion of nitric acid.

In at least one embodiment, neutralization chamber 230 may be configured to mix the contents therein. In one implementation, neutralization chamber 230 may mixing the contents therein using a stirrer or by rotating neutralization chamber 230. The sizing of neutralization chamber 230 may be such that it has enough material capacity to smooth the fertilizer production to match the desired application over the scale of days. Neutralization chamber 230 may also be configured to add water for pH, dilution, cleaning, and composition control. For example, neutralization chamber 230 may have a port configured to allow for the addition of water or other materials. As one skilled in the art may realize, it is advantageous, when more than one neutralization chamber 230 is employed, to provide each neutralization chamber 230 with independently addressable valves such that different compositions of fertilizer may be produced.

It may be desirable to locate neutralization chamber 230 above mixing chamber 240, such that pumping may be avoided and gravity used to move the fertilizer from neutralization chamber 230 to mixing chamber 240 or from absorber 220 to mixing chamber 240. In other words, in some embodiments, system 200 may be free of a pump or compressor between neutralization chamber 230 and mixing chamber 240 or between absorber 220 and mixing chamber 240. Although system 200 is illustrated as containing a neutralization chamber 230, in some embodiments system 200 includes a storage chamber instead of, or in addition to, a neutralization chamber 230. The storage chamber may be similar to or the same as neutralization chamber 230, except that the storage chamber does not include a neutralization agent. For example, the storage chamber may be in fluidic communication with all the same components and/or conduits as neutralization chamber 230. In at least one embodiment, the storage chamber has the same structure and/or is constructed from the same materials as neutralization chamber 230. In some embodiments, the storage chamber may be fluidically adjacent to the neutralization chamber 230 and may be in fluidic communication with the neutralization chamber 230 and the same components and/or conduits as neutralization chamber 230.

Figure 3:
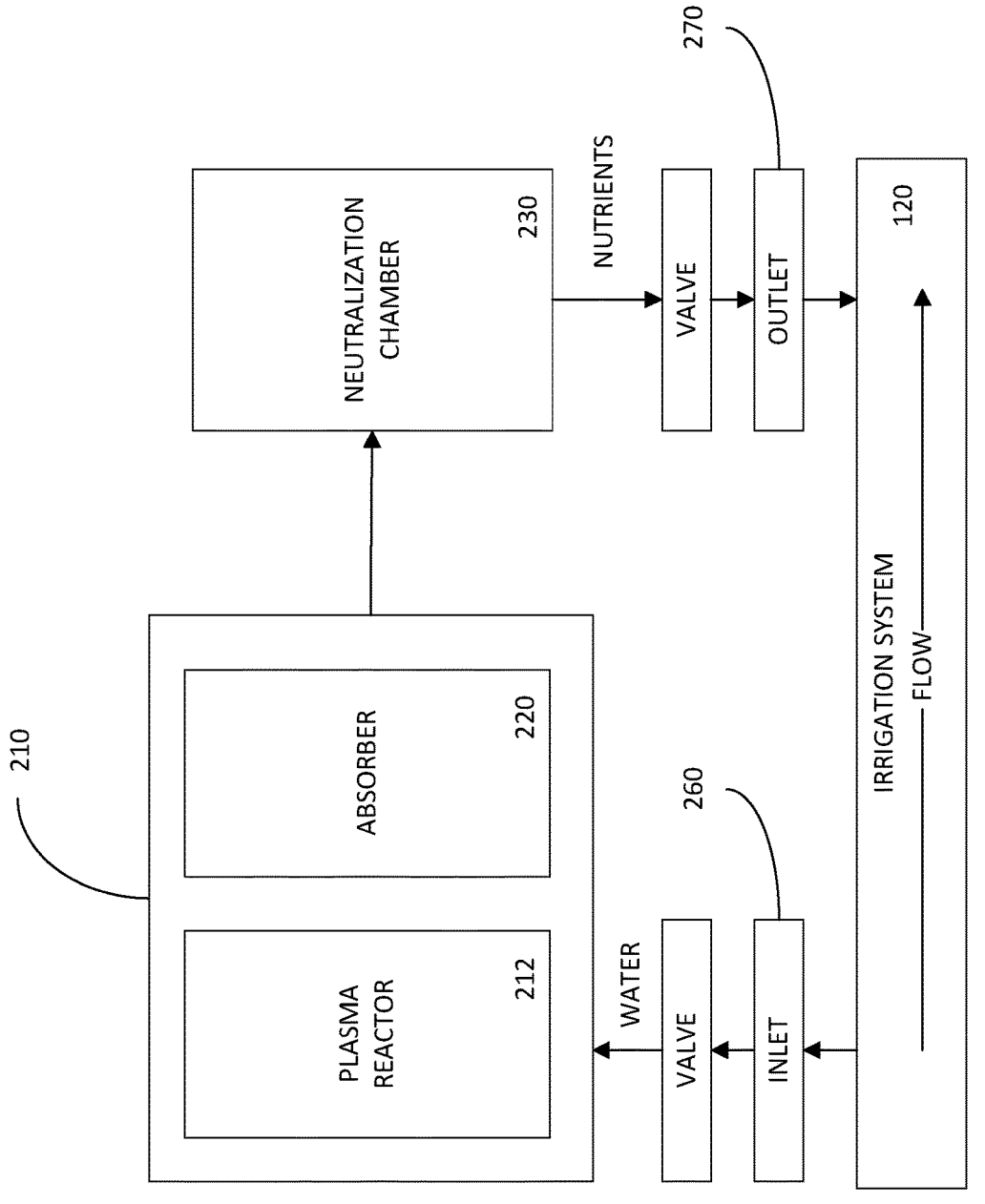
FIG. 3 illustrates an alternative arrangement of components of the exemplary system of FIG. 2 in accordance with aspects of the disclosure.

System 200 may include a mixing chamber 240. Mixing chamber 240 may be in fluid communication with neutralization chamber 240 and/or absorber 220 and configured to receive a neutralized nitrogen-compound stream and/or a nitrogen-compound stream (See FIG. 3). For example, mixing chamber 240 may be in fluid communication with a neutralization chamber 240 by way of a conduit to receive the neutralized nitrogen-compound stream from neutralization chamber 240. Additionally or alternatively, mixing chamber 240 may in fluid communication with absorber 220 by way of a conduit to receive the nitrogen-compound stream from absorber 220.

Mixing chamber 240 may be provided to increase mixing time and/or settling/separation time to remove potential solids (e.g., inert compounds from raw materials). Mixing chamber 240 may be configured to mix the content of the nitrogen-compound stream and/or the neutralized nitrogen-compound stream using a stirrer. In at least one embodiment, mixing chamber 240 is configured to rotate and includes flights (sometimes referred to as material lifters) to facilitate mixing of the content of the nitrogen-compound stream and/or the neutralized nitrogen-compound stream. Mixing chamber 240 may include an outlet port located in the top, side, or bottom to minimize clogging or to collect compounds/content of a desired density. For example, the outlet port of mixing chamber 240 may be located in the side at a height of about 1 inch or more to minimize clogging of the outlet port.

System 200 may include a pump for pressurizing and moving the contents of the stream, e.g., through one or more conduits. Suitable pumps include, positive displacement pumps, negative displacement pumps, venturi pumps, centrifugal pumps, etc. In at least one embodiment, system 200 may utilize the excess pressure generated from an existing irrigation system or fertilizer production system. Preferably, system 200 includes an injection pump for injecting and/or urging nitrogen-compound stream or neutralized nitrogen-compound stream to system-outlet port 260. For example, injection pump 250 may be fluidically coupled to receive and pump the nitrogen-compound stream and/or neutralized nitrogen-compound stream. Injection pump 250 may be located downstream from one or more of absorber 220, neutralization chamber 230, and mixing chamber 240 and configured to pump the nitrogen-compound stream and/or neutralized nitrogen-compound stream to system-outlet port 260. In at least one embodiment, injection pump 250 is fluidically coupled to a conduit that is configured to receive the nitrogen-compound stream from absorber 220 and/or neutralized nitrogen-compound stream from neutralization chamber 230.

System 200 may be integrated with an irrigation system by directly or indirectly coupling system 200 to an irrigation system. For example, system 200 may include a system-outlet port 260 that is coupleable to an irrigation line of an irrigation system. System-outlet port 260 may be coupled (directly or indirectly) to an irrigation line, such that system-outlet port 260 and system 200 is in fluid communication with the irrigation line. System-outlet port 260 may be a nozzle (Venturi pump (nozzle), check valve nozzle, injection nozzle, adjustable pressure nozzle, water powered nozzle), pipe, coupling (e.g., full coupling, half coupling, reducing coupling, compression coupling, or slip coupling), etc. In one example, the valve is a one-way valve that provides fertilizer to the irrigation system but does not allow water to back flow into the fertilizer system.

Additionally or alternatively, system 200 may include a system-inlet port 270 configured to be coupled (directly or indirectly) to an irrigation line of an irrigation system. System-inlet port 270 may be fluidically coupleable to the irrigation line and configured receive a liquid, typically water, from the irrigation line. System-inlet port 270 may be in fluid communication by way of a conduit with absorber 220. Additionally or alternatively, system 200 may use water from the irrigation line to cool one or more components of system 200, such as plasma reactor 212, absorber 220, neutralization chamber 230, a storage chamber, and/or mixing chamber 240. For example, inlet port 270 may be in fluid communication via a conduit with a cooling jacket, radiator, or other cooling devices around the plasma reactor 212, such that the liquid (water) from irrigation line is used to cool plasma reactor 212 or systems powering the plasma reactor. Suitable cooling devices includes radiators, cooling jackets, cooling tanks, etc.

System-inlet port 270 may be a nozzle (Venturi pump (nozzle), check valve nozzle, adjustable pressure nozzle, water powered nozzle), pipe, coupling (e.g., full coupling, half coupling, reducing coupling, compression coupling, or slip coupling), etc. System-inlet port 270 may be attached to an irrigation line by any known means.

In some embodiments, system 200 includes a system-inlet port 270 configured to be fluidically coupled to an irrigation line to receive a liquid, at least a portion of which is water, and a system-outlet port 260 configured to be fluidically coupled to an irrigation line to provide the nitrogen-compound stream and/or neutralized nitrogen-compound stream to the irrigation line. In some embodiments, system-inlet port 270 is fluidically coupled to the same irrigation line as system-outlet port 260. In at least one implementation, system-inlet port 270 is fluidically coupled to the same irrigation line as system-outlet port 260, wherein system-inlet port 270 is coupled to a section of irrigation line that is upstream from the section of irrigation line coupled to system-outlet port 260.

Valves, such as one-way valves, may be included in system 200 to facilitate flow direction. In one example, a one-way valve 275 is in fluid communication with system-outlet port 260 and configured to permit fluid to flow therethrough in solely one direction toward system-outlet port 260. For example, one-way valve 275 may be coupled to a conduit leading to system-outlet port 260 and configured to prohibit liquid from flowing to a component upstream from system-outlet port 260, such as injection pump 250, mixing chamber 240, neutralization chamber 230 and/or absorber 220.

System 200 may include one or more filters. In one embodiment, system 200 includes an outlet filter in fluid communication with system-outlet port 260. The outlet filter may have a pore size, thickness, and material to remove particles from the neutralized nitrogen-compound stream and/or nitrogen-compound stream, e.g., before such stream is provided to the irrigation line. In some embodiments, filters may be layered screen filters, disc filters, media filters, coarse material filters, or sand separator filters, or a combination of these. The filters may have a pore size of about 10 to about 1000 microns. For example, the filters may have a pore or particle-filtration size of about 25 to about 900 microns, about 35 to about 700 microns, about 45 to about 400 microns, about 25 to about 500 microns, or any range or subrange therebetween. In some instances, a ratio of the pore filter size to the emitter hole diameter—which is a hole typically located at the output of the irrigation system, e.g., drip, emitter, or spray hole size—can is about 1:10 to about 1:1. For example, the ratio of the pore filter size to the drip, emitter, or spray hole size is about 1:10 to about 1:1, about 1:8 to about 1:2, about 1:5 to about 1:3. In one embodiment, the ratio the pore filter size to the drip, emitter, or spray hole size is about 1:5. In another embodiment, the ratio of the pore filter size to the drip, emitter, or spray hole size is about 1:3. Additionally or alternatively, system 200 may have filters located to remove particles from stream leaving absorber 220, neutralization chamber 230, and/or mixing chamber 240. For example, neutralization chamber 230 may include a filter coupled to an outlet port of the neutralization chamber 230 to prevent or reduce the number particles in the neutralized nitrogen-compound stream.

Additionally or alternatively, system 200 or certain components thereof may advantageously be in a housing. The housing may be a container, such as a cargo container, or another type of housing. In one implementation, system 200 or certain components thereof are in a single housing. For example, it may be beneficial to include one or more of plasma reactor 212, absorber 220, neutralization chamber 230, mixing chamber 240, and injection pump 250 in a single housing. In one embodiment, system 200 includes plasma reactor 212 and absorber 220 in a single housing. In another embodiment, system 200 includes absorber 220 and neutralization chamber 230 in a single housing. In yet a further embodiment, system 200 includes absorber 220 and mixing chamber 240 in a single housing.

In some cases, system 200 may include a chassis for supporting one or more components of system 200. For example, it may be beneficial to support one or more of plasma reactor 212, absorber 220, neutralization chamber 230, mixing chamber 240, and injection pump 250 on a surface of a chassis. In one embodiment, plasma reactor 212 and absorber 220 are supported on a chassis. In another embodiment, absorber 220 and neutralization chamber 230 are supported on a chassis. In yet a further embodiment, absorber 220 and mixing chamber 240 are supported on a chassis. The chassis may be configured to enable system 200 to be mobile. For example, the chassis may have two or more wheels or be configured to be moved by a forklift, crane, and/or trailer.

System 200 may include a controller 280 coupled to a sensor(s). Controller 280 may be configured to activate one or more components of system 200. For instance, controller 280 may be able to activate plasma reactor 212 and absorber 220 in response to liquid flowing through the irrigation line and/or deactivate plasma reactor 212 and absorber 220 in response to liquid ceasing flow through the irrigation line. Additionally or alternatively, controller 280 may be coupled to one or more sensors for determining a pH of the liquid in the absorber, the pH of the nitrogen-compound stream, and/or the pH of the neutralized nitrogen-compound stream. Suitable sensors include, pH sensors, flow meters, level sensors, dynamic light scattering, viscometers, molecular weight, pressure, temperature, refractometer, optical fiber sensors, and the like.

In various possible embodiments, controller 280 may be configured to: measure nitric acid concentration in absorber 220; retain the liquid in absorber 220 until a desired pH and/or nitric acid concentration is obtained; direct at least a portion of the nitrogen-compound stream to neutralization chamber 230, mixing chamber 240, or injection pump 250; actuate filling of absorber 220 with water, e.g., from system-inlet port 270; and/or determine the amount of content in neutralization chamber 240. For instance, controller 280 may be configured to determine an amount and/or concentration of nitric acid in absorber 220 based on data from pH sensor and/or a conductivity sensor. Based on the determined amount and/or concentration of nitric acid and the type of soil to receive the nitrogen compounds, controller 280 may determine an amount of the liquid in absorber 220 (nitrogen-compound stream) to be provided to neutralization chamber 230. For example, controller 280 may activate the release of nitrogen-compound stream from absorber 220 or a storage chamber, and/or activate the release of the neutralized nitrogen-compound stream from neutralization chamber 230. Controller 280 may open and/or close one or more valves to control and/or direct the amount of nitrogen-compound stream provided to neutralization chamber 230.

Additionally or alternatively, controller 280 may control the amount of time the nitrogen compounds remain in neutralization chamber 230 by opening or closing valves to obtain a desired amount of neutralized nitrogen compounds and/or desired pH, e.g., based on data from a pH sensor and/or a conductivity sensor. Controller 280 may open and close one or more valves to control the amount of neutralized nitrogen-compound stream provided to mixing chamber 240, injection pump 250, and/or system-outlet port 260. Controller 280 may actuate the filling of absorber 220 by opening a valve to permit water from an irrigation system to flow to absorber 220, activating one or more pumps, and/or activating plasma reactor 210.

Controller 280 may be configured to activate one or more of plasma reactor 212, absorber 220, neutralization chamber 230, and injection pump 250 in response to a detection of liquid flow through the irrigation line. Controller 280 may deactivate plasma reactor 212 before deactivating absorber 220 to increase the conversion of oxidized nitrogen species to nitrates, nitrites, nitric acid, salts thereof, or a mixture thereof in the absorber when a recycle stream is utilized, e.g., as disclosed in U.S. patent application Ser. No. 17/240, 768, which is incorporated herein by reference in its entirety for all purposes. In some instances, control 280 is configured to activate the flow of the nitrogen-compound stream (comprising water, nitrates, nitrites, nitric acid, salts thereof, or a mixture thereof) from absorber 220 and/or activate the flow of the neutralized nitrogen-compound stream (comprising one or more neutralized nitrogen compounds) from neutralization chamber 230 in response to liquid flowing through the irrigation line. In one embodiment, controller 280 is configured to purge nitrogen production unit 210 by turning off plasma reactor 212, opening a bypass valve, and opening a purge valve. Controller 280 may activate the release of nitrogen-compound stream and/or neutralized nitrogen-compound stream into the irrigation line in response to a determination of a liquid flow through the irrigation line.

Figure 4:
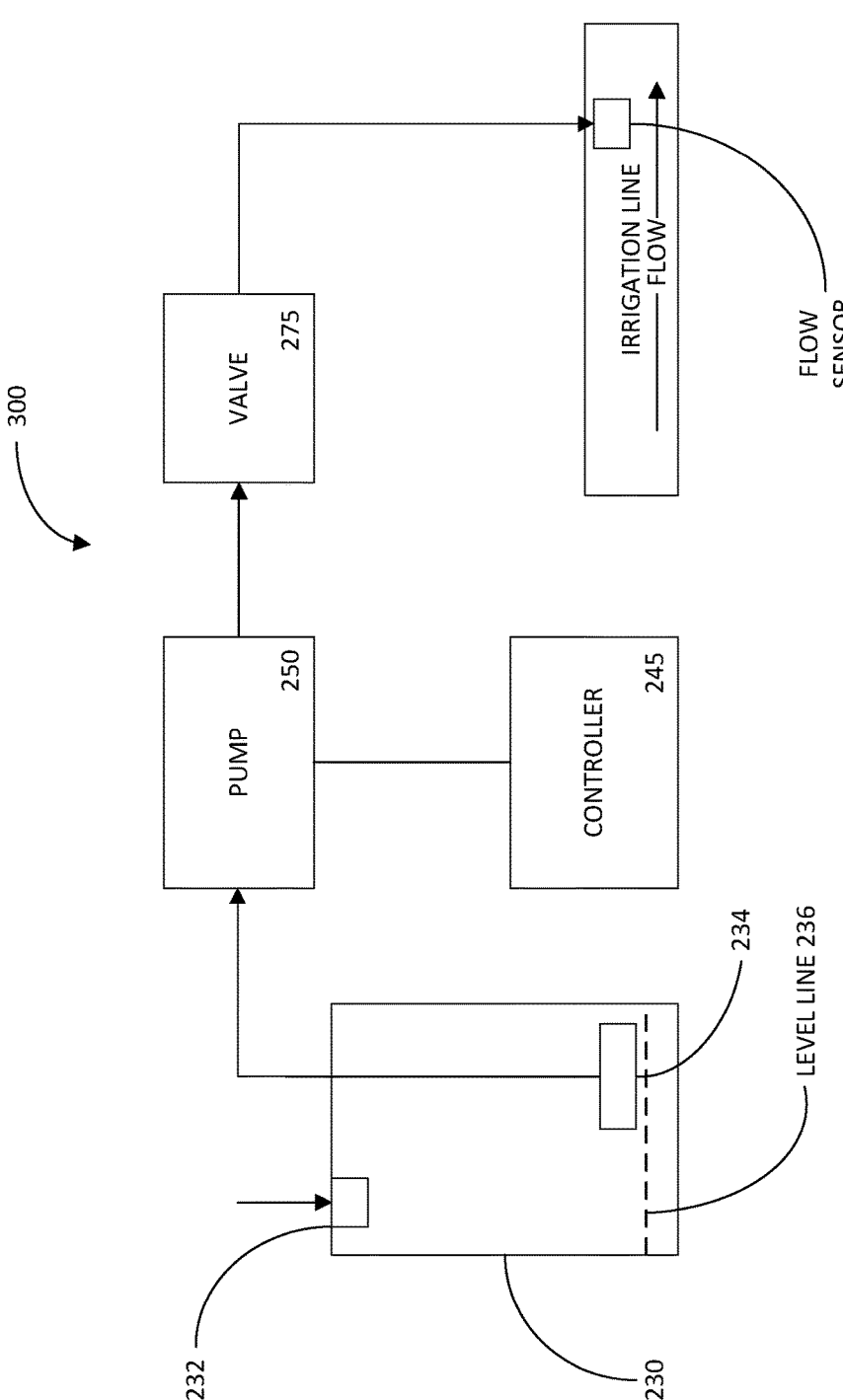
FIG. 4 illustrates a section of a further non-limiting, exemplary system for producing nitrogen compounds that is configured for integration with an irrigation system in accordance with aspects of the disclosure.

With reference to FIG. 4, provided is a system 300 for producing nitrogen compounds that is coupleable to an irrigation system or a section thereof. System 300 is similar system 200. Accordingly, where system 300 utilizes components that are similar to those of system 200, similar reference numerals are applied. It should be understood that although similar reference numerals are utilized, various aspects of the features of system 300, e.g., size, material, etc. may be different from those described with respect to systems 200. Additionally, system 300 may include nitrogen production unit 210, even though nitrogen production unit 210 is not shown in FIG. 4.

As shown in FIG. 4, inlet port 232, which is in fluid communication with the nitrogen producing unit 210, leads to neutralization chamber 230. Neutralization chamber 230, components therein, and inlet port 232 may be constructed of a material selected to withstand the chemical nature of the output from the nitrogen producing unit 210. In certain embodiments, the output (nitrogen-compound stream) of the nitrogen producing unit 210 contains nitric acid, a strong and oxidizing acid. In this case, materials such as PVC, stainless steel, glass, cement, granite, alumina or other acid stable materials may be used. Neutralization chamber 230 may serve multiple purposes. For example, neutralization chamber 230 may contain a solid reagent meant to modify the pH of the nitrogen compounds and/or add additional nutrient value. In some instances, neutralization chamber 230 may contain nutrients, such as K, P, Ca, Zn, S, and/or trace minerals (Cu, Na, B, Fe, Mn, Mo dependent on crop). The solid reagent may be chosen from $CaCO_3$, $Ca(OH)_2$, KOH, $K_2CO_3$, lime, potash, sodium salts, rock phosphate, other salts or minerals for nutrient application, and combinations thereof. The fill level for neutralization chamber 230 may be chosen to be below the neutralization filter 234. Neutralization filter 234 may be located along a conduit and be configured to prevent particles from the solid reagent from entering the irrigation system. In a non-limiting embodiment, the level is maintained by visual comparison to level lines 236; however, in certain embodiments this may be accomplished by level sensors, for example. A conduit may lead from neutralization filter 234 to injection pump 250. In one embodiment, injection pump 250 is a positive displacement pump designed to provide a precise flow of nitrogen-compound stream and/or neutralized nitrogen-compound stream to the agricultural field. One skilled in the art will also recognize the ability to use a suction-based method for moving the fertilizer, such as a venturi valve. Injection pump 250 may be in fluid communication, by way of a conduit, to check valve 252.

Preferably, the conduits and valves are constructed of a material designed to resist the chemical nature of the nitrogen compounds as well as survive in a farm setting, with potential for dust, UV radiation, inclement weather, and other risks. Check valve 252 functions to prevent backflow of water into injection pump 250 or neutralization chamber 230. In one embodiment, a conduit leads to system-outlet port 260, which is disposed inside an irrigation line. The irrigation line may be the main flow of irrigation water to the field. The flow rate of the irrigation line may be much greater than that of system 300. Injection pump 250 may be configured to supply the pressure head to pump into the irrigation line at the desired flow rate. For fertilizer solutions with different densities or viscosity, system-outlet port may have a nozzle configured to provide optimal mixing into the irrigation line.

System 300, as illustrated in FIG. 4, includes a micro-controller 245 that is only connected to injection pump 250 and operates on a predetermined schedule. In other embodiments, the microcontroller 245 may be configured to receive a signal from the irrigation system, such as a flow or pressure sensor disposed to monitor flow in the irrigation line, to trigger injection pump 250. The microcontroller 245 may also be configured to sense the level of liquid in neutralization chamber 230 to assure that injection pump 250 does not run neutralization chamber 230 and/or mixing chamber 240 dry.

According to another aspect of the disclosure, provided is a method for producing nitrogen compounds. Method 600 may utilize any of the systems, components thereof, and/or features/elements thereof described above with respect to systems 100, 200, 300, and 400.

In step 410, water flow through an irrigation line is detected using a sensor. The sensor may be coupled to a controller. In at least one implementation, the sensor is a flow meter, a level meter, or the like. The controller may activate one or more component of a system for producing nitrogen compounds in response to detecting water flow through an irrigation line. For example, the controller may activate a plasma reactor, a valve, a pump, a mixing chamber, or a combination thereof in response to detecting water flow through an irrigation line. In certain embodiments, the controller opens a valve to allow water to be received from an irrigation by way of a system-inlet port. The water may be provided to the absorber using the system-inlet port or a conduit fluidically coupled thereto.

The method may include producing a reactor-outlet stream comprising nitric acid, oxidized nitrogen species, or a mixture thereof. The reactor-outlet stream may comprise one or more oxidized nitrogen species, such as NO, $NO_2$, $N_2O_4$, $N_2O$, $HNO_2$, $HNO_3$, $N_2O_5$, HNO, or a mixture thereof. The nitric acid, oxidized nitrogen species, salts thereof, or a mixture thereof is preferably produced using a plasma of nitrogen and oxygen. In some instances, the plasma of nitrogen and oxygen is produced as a non-thermal plasma of nitrogen and oxygen.

In step 420, the method includes producing nitrates, nitrites, salts thereof, or a mixture thereof, e.g., from the reactor-outlet stream, using an absorber. Preferably, components of the reactor-outlet stream, such as the oxidized nitrogen species, are oxidized by diffusing through the liquid of the absorber. In some instances, the absorber converts at least 50%, by volume, of the oxidized nitrogen species in the effluent stream. For example, in some cases, about 55 vol. % or more, about 60 vol. % or more, about 65 vol. % or more, about 70 vol. % or more, about 75 vol. % or more, about 80 vol. % or more, about 85 vol. % or more, about 90 vol. % or more, or about 95 vol. % or more, based on the amount by weight of the oxidized nitrogen species entering the absorber via the reactor-outlet stream.

At least a portion of the oxidized nitrogen species, nitrates, nitrites, nitric acid, salts thereof, or a mixture thereof may be removed from the reactor-outlet stream using an absorber, such that the absorber produces a gas phase stream and a liquid phase, wherein the liquid phase comprises the removed portion of the oxidized nitrogen species, nitrates, nitrites, nitro-phosphates, nitric acid, salts thereof, or a mixture thereof. The gas phase may be recycled to the plasma reactor via a recycle stream, e.g., in U.S. patent application Ser. No. 17/240,768, which is incorporated herein by reference in its entirety for all purposes.

The absorber may remove the at least a portion of the oxidized nitrogen species nitrates, nitrites, nitro-phosphates, nitric acid, salts thereof, or a mixture thereof from the effluent stream by bubbling the reactor-outlet stream through the liquid phase. The liquid phase may be provided, as the nitrogen-compound stream, to a neutralization chamber, a mixing chamber, and/or the system-outlet port.

The method may include neutralizing the nitrogen-compound stream using a neutralization chamber. For example, the neutralizing chamber may produce a neutralized nitrogen-compound stream from the nitrogen-compound stream produced by the absorber. The method may include the step of adding a basic compound, and/or a catalyst to the neutralization chamber. The basic compound may be chosen from calcium carbonate, sodium hydroxide, potassium hydroxide, and a mixture thereof. The resulting compound may be calcium nitrate, potassium nitrate, sodium nitrate, other nitrates, nitrophosphates, ammonium nitrate, among other nitrate-based compounds. In at least one embodiment, the basic compound comprises CaCO3, $Ca(OH)_2$, KOH, $K_2CO_3$, lime, potash, sodium salts, rock phosphate, and/or other salts or minerals that may be used to neutralize nitric acid. In at least one embodiment, the method includes determining a pH of nitrogen-compound stream using a pH meter. Based on the pH of the nitrogen-compound stream, the controller may activate a valve to permit flow of the nitrogen-compound stream to the neutralization chamber to obtain a desired pH. In another embodiment, the method includes measuring the composition of the nitrogen-compound stream or inferring the pH with, for example, a conductivity sensor or an ionicity detector.

Additionally or alternatively, the method may include a mixing chamber for mixing the neutralized nitrogen-compound stream and/or nitrogen-compound stream.

In step 430, the neutralized nitrogen-compound stream and/or nitrogen-compound stream is provided to a system-outlet port that is fluidically coupleable to an irrigation system or an irrigation line thereof.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended thereto.

The terms "comprising," "having," and "including" are used in their open, non-limiting sense. The terms "a" and "the" are understood to encompass the plural as well as the singular. The compositions and methods of the present disclosure can comprise, consist of, or consist essentially of the essential elements and limitations of the disclosure described herein, as well as any additional or optional ingredients, components, or limitations described herein or otherwise useful.

All percentages, parts and ratios herein are based upon the total weight of the compositions of the present disclosure, unless otherwise indicated. All ranges and values disclosed herein are inclusive and combinable. The expression "inclusive" for a range of concentrations means that the limits of the range are included in the defined interval. For examples, any value or point described herein that falls within a range described herein can serve as a minimum or maximum value to derive a sub-range, etc. Furthermore, all ranges provided are meant to include every specific range within, and combination of sub ranges between, the given ranges. Thus, a range from 1-5, includes specifically 1, 2, 3, 4 and 5, as well as sub ranges such as 2-5, 3-5, 2-3, 2-4, 1-4, etc.

Other than in the operating examples, or where otherwise indicated, all numbers expressing quantities of ingredients and/or reaction conditions are to be understood as being modified in all instances by the term "about," meaning within +/−5% of the indicated number.

As used herein, the expression "at least one" is interchangeable with the expression "one or more" and thus includes individual components as well as mixtures/combinations.

Throughout the disclosure, the term "a mixture thereof" or "a combination thereof" may be used following a list of elements as shown in the following example where letters A-F represent the elements: "one or more elements selected from the group consisting of A, B, C, D, E, F, and a mixture thereof." The term, "a mixture thereof" or "a combination thereof" does not require that the mixture include all of A, B, C, D, E, and F (although all of A, B, C, D, E, and F may be included). Rather, it indicates that a mixture and/or a combination of any two or more of A, B, C, D, E, and F can be included. For example, it is equivalent to the phrase "one or more elements selected from the group consisting of A, B, C, D, E, F, and a mixture of any two or more of A, B, C, D, E, and F."

Likewise, the term "a salt thereof" also relates to "salts thereof." Thus, where the disclosure refers to "an element selected from the group consisting of A, B, C, D, E, F, a salt thereof, and a mixture thereof," it indicates that that one or more of A, B, C, D, and F may be included, one or more of a salt of A, a salt of B, a salt of C, a salt of D, a salt of E, and a salt of F may be included, or a mixture (or combination) of any two of A, B, C, D, E, F, a salt of A, a salt of B, a salt of C, a salt of D, a salt of E, and a salt of F may be included. The salts referred to throughout the disclosure may include salts having a counter-ion such as an alkali metal, alkaline earth metal, or ammonium counter-ion. This list of counter-ions, however, is non-limiting.

All components and elements positively set forth in this disclosure can be negatively excluded from the claims. In other words, the systems or methods of the instant disclosure can be free or essentially free of all components, features, elements, and more method steps positively recited throughout the instant disclosure.

All publications and patent applications cited in this specification are herein incorporated by reference, and for any and all purposes, as if each individual publication or patent application were specifically and individually indicated to be incorporated by reference. In the event of an inconsistency between the present disclosure and any publications or patent application incorporated herein by reference, the present disclosure controls.

What is claimed is:

1. A system for producing nitrogen compounds that is configured for integration with an irrigation device, the system comprising:

an absorber receiving a reactor-outlet stream comprising one or more oxidized nitrogen species, the absorber containing water to produce a nitrogen-compound stream comprising nitrates, nitrites, nitric acid, salts thereof, or a mixture thereof;

a system-outlet port configured to be fluidically coupled to an irrigation line, the system-outlet port in fluid communication with the absorber to receive at least a portion of the nitrogen-compound stream and provide the nitrogen-compound stream to the irrigation line;

a one-way valve in fluid communication with the system-outlet port and configured to permit fluid to flow therethrough in solely one direction, wherein the one-way valve is arranged to permit fluid to flow to the system-outlet port;

a plasma reactor producing the reactor-outlet stream comprising the one or more oxidized nitrogen species, the plasma reactor in fluid communication with the absorber; and a storage chamber in fluid communication with the absorber to receive the nitrogen-compound stream from the absorber;

wherein the storage chamber is a neutralization chamber configured to produce a neutralized nitrogen-compound stream comprising at least one neutralized nitrogen compound chosen from calcium carbonate, sodium carbonate, magnesium carbonate, calcium hydroxide, potassium carbonate, potassium hydroxide, potash, lime grit, limestone, rock phosphate, ammonium hydroxide, calcium nitrate, zinc oxide, potassium nitrate, sodium nitrate, nitrophosphates, ammonium nitrate, zinc nitrate, and a combination thereof;

an injection pump in fluid communication with the neutralization chamber, the injection pump to pump the neutralized nitrogen-compound stream to the system-outlet port;

wherein the one-way valve is disposed within a conduit downstream from the injection pump; and an outlet filter in fluid communication with the system-outlet port, the outlet filter is downstream from the injection pump and upstream from the system-outlet port or the outlet filter is downstream from the neutralization chamber and upstream from the injection pump, the filter to remove particles before the nitrogen compound stream is provided to the irrigation line.

2. The system of claim 1, wherein the neutralization chamber includes a filter coupled to an outlet port of the neutralization chamber.

3. The system of claim 1, further comprising:

a mixing chamber in fluid communication with the neutralization chamber and configured to receive and mix the neutralized nitrogen-compound stream.

4. The system of claim 1 further comprising:

a water-inlet conduit fluidically coupleable to the irrigation line and configured to receive water from the irrigation line, the water-inlet conduit is in fluid communication with the absorber and is configured to provide water to the absorber.

5. The system of claim 1, further comprising:

a sensor detecting liquid flow through the irrigation line; and a controller coupled to the sensor, the controller configured to activate the release of the nitrogen-compound stream, the neutralized nitrogen-compound stream, or a combination thereof through the system output port and into the irrigation line in response to liquid flowing through the irrigation line.

* * * * *